(12) United States Patent
Wolff et al.

(10) Patent No.: US 7,493,559 B1
(45) Date of Patent: Feb. 17, 2009

(54) SYSTEM AND METHOD FOR DIRECT MULTI-MODAL ANNOTATION OF OBJECTS

(75) Inventors: Gregory J. Wolff, Redwood City, CA (US); Peter E. Hart, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 397 days.

(21) Appl. No.: 10/043,575

(22) Filed: Jan. 9, 2002

(51) Int. Cl.
*G06F 3/00* (2006.01)

(52) U.S. Cl. .................. 715/727; 715/763; 715/860; 715/838

(58) Field of Classification Search ............... 715/727, 715/728, 716, 512, 763, 860, 838
See application file for complete search history.

(56) References Cited

U.S. PATENT DOCUMENTS

| | | | | |
|---|---|---|---|---|
| 5,481,345 A * | 1/1996 | Ishida et al. | ................. | 399/296 |
| 5,502,727 A * | 3/1996 | Catanzaro et al. | ........... | 370/271 |
| 5,537,526 A * | 7/1996 | Anderson et al. | ........... | 715/515 |
| 5,546,145 A * | 8/1996 | Bernardi et al. | ............. | 396/312 |
| 5,600,775 A * | 2/1997 | King et al. | ................. | 715/500 |
| 5,623,578 A * | 4/1997 | Mikkilineni | ................. | 704/255 |
| 5,649,104 A * | 7/1997 | Carleton et al. | ............ | 709/204 |
| 5,671,428 A * | 9/1997 | Muranaga et al. | ........... | 715/751 |
| 5,826,025 A * | 10/1998 | Gramlich | .................... | 709/217 |
| 5,838,313 A * | 11/1998 | Hou et al. | ................. | 715/500.1 |
| 5,845,301 A * | 12/1998 | Rivette et al. | ............... | 715/512 |
| 5,857,099 A * | 1/1999 | Mitchell et al. | ............. | 704/235 |
| 5,881,360 A * | 3/1999 | Fong | ........................... | 725/18 |
| 5,893,126 A * | 4/1999 | Drews et al. | ................. | 715/512 |
| 5,933,804 A * | 8/1999 | Huang et al. | ................. | 704/244 |
| 6,041,335 A * | 3/2000 | Merritt et al. | ................. | 715/512 |
| 6,101,338 A * | 8/2000 | Bernardi et al. | ............. | 396/287 |
| 6,119,147 A * | 9/2000 | Toomey et al. | ............... | 709/204 |
| 6,226,422 B1 * | 5/2001 | Oliver | ........................ | 382/313 |
| 6,230,171 B1 * | 5/2001 | Pacifici et al. | ................. | 715/512 |
| 6,279,014 B1 * | 8/2001 | Schilit et al. | ................. | 715/512 |
| 6,388,681 B1 * | 5/2002 | Nozaki | ........................ | 715/764 |
| 6,401,069 B1 * | 6/2002 | Boys et al. | ................... | 704/275 |
| 6,499,016 B1 * | 12/2002 | Anderson | .................... | 704/275 |
| 6,510,427 B1 * | 1/2003 | Bossemeyer et al. | ........... | 707/6 |
| 6,546,405 B2 * | 4/2003 | Gupta et al. | ................. | 715/512 |
| 6,624,826 B1 * | 9/2003 | Balabanovic | ................ | 715/727 |

(Continued)

OTHER PUBLICATIONS

Lin, James. An Ink and Voice Annotation System for DENIM. Sep. 8, 1999. pp. 1-7.*

(Continued)

*Primary Examiner*—Stephen Hong
*Assistant Examiner*—Ryan F Pitaro
(74) *Attorney, Agent, or Firm*—Fenwick & West LLP

(57) ABSTRACT

The system includes an image display system, a direct annotation creation module, an annotation display module, a vocabulary comparison module and a dynamic updating module. These modules are coupled together by a bus and provide for the direct multi-modal annotation of media of media objects. The direct annotation creation module creates annotation objects. The annotation display module works in cooperation with the image display system to display the annotations themselves or graphic representations of the annotation positioned relative to the images of the objects. The system automatically creates the annotation, associates it with the selected images, and displays either a graphic representation of the annotation or a text translation of the audio input.

26 Claims, 20 Drawing Sheets

U.S. PATENT DOCUMENTS

| | | | |
|---|---|---|---|
| 6,687,878 B1* | 2/2004 | Eintracht et al. | 715/512 |
| 6,859,909 B1* | 2/2005 | Lerner et al. | 715/512 |
| 2002/0099552 A1* | 7/2002 | Rubin et al. | 704/270 |
| 2002/0116420 A1* | 8/2002 | Allam et al. | 707/526 |
| 2004/0034832 A1* | 2/2004 | Taylor et al. | 715/512 |
| 2004/0201633 A1* | 10/2004 | Barsness et al. | 345/864 |
| 2004/0267693 A1* | 12/2004 | Lowe et al. | 707/1 |

OTHER PUBLICATIONS

Balabanovic, Marko, Multimedia Chronicles for Business Communication, 2000 IEEE, pp. 1-10.*

Heck et al., "A survey of Web Annotation Systems", Dept. of Math and Comp. Sci. Grinnell College, 1999 pp. 1-6.*

Balabanovic, Marko "Multimedia Chronicles for Business Communication", 2000, IEEE, pp. 1-10.*

* cited by examiner

SYSTEM AND METHOD FOR DIRECT MULTI-MODAL ANNOTATION OF OBJECTS

BACKGROUND OF THE INVENTION

1. Field of the Invention

The present invention relates to systems and methods for annotating objects. In particular, the present invention relates to a system and method for annotating images with audio input signals. The present invention also relates to a method for translation of audio input and providing display feedback of annotation.

2. Description of the Background Art

With the proliferation of imaging, digital copying, and digital photography, there has been a dramatic increase in the number of images created. This proliferation of images has in turn created a need to track and organize such images. One way to organize images and make them more accessible is to provide annotations to the images, adding information that can put the images in context. Such information makes the images more accessible because the annotations make the images searchable. However, existing methods for annotating images are cumbersome to use and typically very limited.

Even for traditional photographic film, the value in annotating images is well known. For example, there are a variety of cameras that annotate photographic images by adding the time and date when the photograph is taken to the actual image recorded on film. However as noted above, such methods are severely limited and allow little more than the date and time as annotations. In some instances, simple symbols or limited alphanumeric characters are also permitted. Another problem with such annotations is that a portion of the original image where the annotation is positioned is destroyed. Thus, such existing annotation systems and methods are inadequate for the new proliferation of digital images.

There have been attempts in the prior art to provide for annotation of images, but they continue to be cumbersome and difficult to use. One such method allows for the text annotation of images is described in "Direct Annotation: A Drag-and-Drop Strategy for Labeling Photos" by Ben Shneiderman and Hyunmo Kang, Institute for Advanced Computer Studies & Institute for Systems Research University of Maryland. It requires a computer upon which to display the images and a fixed mode for performing annotating. The annotations are entered into the system. Then the images are displayed in an annotation mode along with permissible annotations. The user is able to use a mouse-type controller to drag and drop pre-existing annotations onto images displayed. However, such existing systems do not provide a system for direct annotation without regard to the mode of operation of the system, and do not allow additional type of annotations such audio signals.

Therefore, what is needed is an easy to use system and method for annotating images that overcomes the limitations found in the prior art.

SUMMARY OF THE INVENTION

The present invention overcomes the deficiencies and limitations of the prior art by providing a system and method for direct, multi-modal annotation of objects. The system of the present invention includes an image display system, a direct annotation creation module, an annotation display module, a vocabulary comparison module and a dynamic updating module. These modules are coupled together by a bus and provide for the direct multi-modal annotation of media objects. The image display system is coupled to a media object cache and displays images of media objects. The direct annotation creation module creates annotations in response to user input and stores the annotations in memory. The annotation display module works in cooperation with the image display system to display the annotations themselves or graphic representations of the annotation positioned relative to the images of the objects. The vocabulary comparison module works in cooperation with the direct annotation creation module to receive audio input and present matches of annotations. Similarly, the dynamic updating module receives input annotations, and updates an audio vocabulary to include a text annotation for new audio input signal. The system of the present invention is particularly advantageous because it provides direct annotation of images. Once an image is displayed, the user need only select an image and speak to create an annotation. The system automatically creates the annotation, associates it with the selected images, and displays either a graphic representation of the annotation or a text translation of the audio input. The present invention may also present likely matches of text to the audio input and/or update an audio vocabulary in response to input of audio inputs that are not recognized.

The present invention also includes a number of novel methods including: a method for annotating objects with audio signals, a method for annotating images including vocabulary comparison, a method for annotating images including recording audio annotations, and a method for annotating and dynamically adding to a vocabulary.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION OF THE PREFERRED EMBODIMENTS

Figure 1:
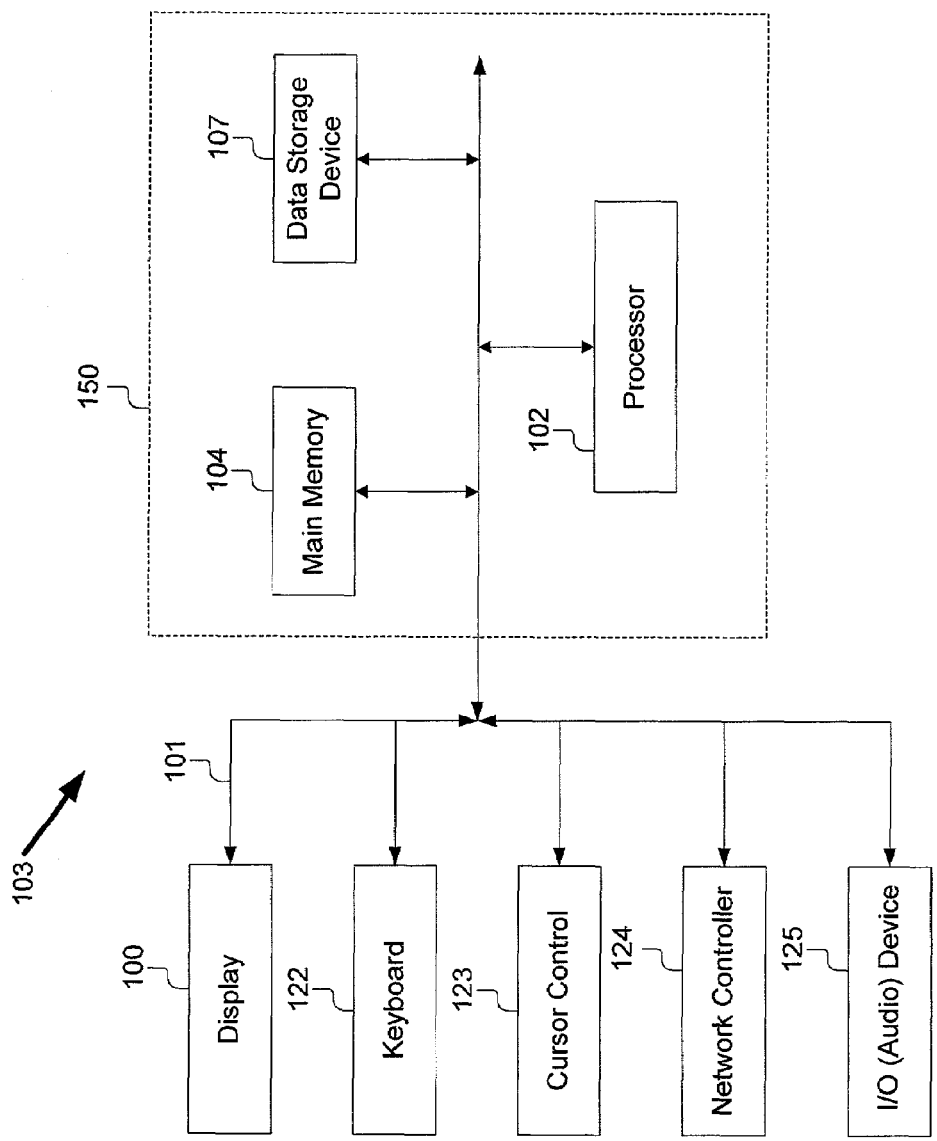
FIG. 1 illustrates a block diagram of a messaging system upon which the present invention operates.

A method and apparatus for direct, multi-modal annotation of objects is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described with reference to the annotation of images using audio input. However, the present invention applies to any media objects, not just images, and the input could be other than audio input.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system. Such an information system as claimed may be an entire messaging system or only portions of such a system. For example, the present invention can operate with an information system that need only be a browser in the simplest sense to present and display media objects. The information system might alternately be the system described below with reference to FIGS. 1 and 2. Thus, the present invention is capable of operating with any information system from those with minimal functionality to those providing all the functionality disclosed herein.

FIG. 1 is a block diagram of one embodiment of an annotation and display system 103 constructed according to the present invention. The annotation and display system 103 preferably comprises a control unit 150, a display device 100, a keyboard 122, a cursor control device 123, a network controller 124 and one or more input/output (I/O) audio device(s) 125.

Control unit 150 may comprise an arithmetic logic unit, a microprocessor, a general purpose computer, a personal digital assistant or some other information appliance equipped to provide electronic display signals to display device 100. In one embodiment, control unit 150 comprises a general purpose computer having a graphical user interface, which may be generated by, for example, a program written in Java running on top of an operating system like WINDOWS® or UNIX® based operating systems. In one embodiment, one or more application programs executed by control unit 150 including, without limitation, word processing applications, electronic mail applications, spreadsheet applications, and web browser applications generate images. In one embodiment, the operating system and/or one or more application programs executed by control unit 150 provide "drag-and-drop" functionality where each image or object may be selected.

Still referring to FIG. 1, the control unit 150 is shown including processor 102, main memory 104, and data storage device 107, all of which are communicatively coupled to system bus 101.

Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included.

Main memory 104 stores instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art. The memory 104 is described in more detail below with reference to FIG. 2. In particular, the portions of the memory for providing direct annotation of objects, display of objects, display of annotations, comparison to an audio vocabulary, and dynamic updating of the audio vocabulary will be described.

Data storage device 107 stores data and instructions for processor 102 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 101 represents a shared bus for communicating information and data throughout control unit 150. System bus 101 may represent one or more buses including an industry standard architecture (ISA) bus, a peripheral component interconnect (PCI) bus, a universal serial bus (USB), or some other bus known in the art to provide similar functionality. Additional components coupled to control unit 150 through system bus 101 include the display device 100, the keyboard 122, the cursor control device 123, the network controller 124 and the I/O device(s) 125.

Display device 100 represents any device equipped to display electronic images and data as described herein. Display device 100 may be, for example, a cathode ray tube (CRT), liquid crystal display (LCD), or any other similarly equipped display device, screen, or monitor. In one embodiment, display device 100 is equipped with a touch screen in which a touch-sensitive, transparent panel covers the screen of display device 100.

Keyboard 122 represents an alphanumeric input device coupled to control unit 150 to communicate information and command selections to processor 102.

Cursor control 123 represents a user input device equipped to communicate positional data as well as command selections to processor 102. Cursor control 123 may include a mouse, a trackball, a stylus, a pen, a touch screen, cursor direction keys, or other mechanisms to cause movement of a cursor.

Network controller 124 links control unit 150 to a network that may include multiple processing systems. The network of processing systems may comprise a local area network (LAN), a wide area network (WAN) (e.g., the Internet), and/or any other interconnected data path across which multiple devices may communicate. The control unit 150 also has other conventional connections to other systems such as a network for distribution of files (media objects) using standard network protocols such as TCP/IP, http, and SMTP as will be understood to those skilled in the art.

One or more I/O devices 125 are coupled to the system bus 101. For example, the I/O device 125 may be an audio input/output device 125 equipped to receive audio input such as via a microphone and transmit audio output via speakers. Audio input may be received through various devices including a microphone within I/O audio device 125 and network controller 124. Similarly, audio output may originate from various devices including processor 102 and network controller 124. In one embodiment, audio device 125 is a general purpose; audio add-in/expansion card designed for use within a general purpose computer system. Optionally, I/O audio device 125 may contain one or more analog-to-digital or digital-to-analog converters, and/or one or more digital signal processors to facilitate audio processing.

Figure 2:
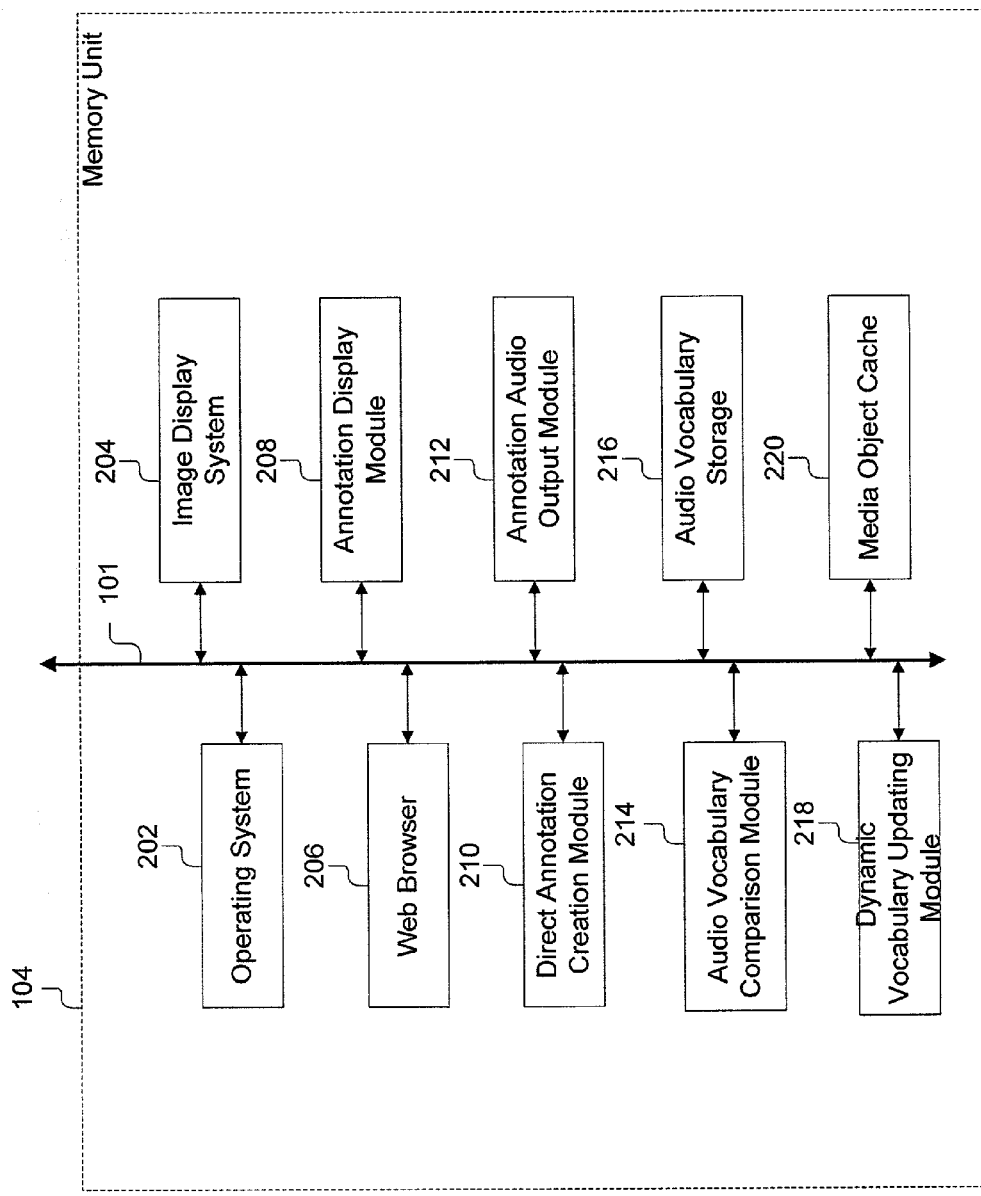
FIG. 2 illustrates a block diagram of a preferred embodiment for a memory of the messaging system of the present invention.

It should be apparent to one skilled in the art that control unit 150 may include more or less components than those shown in FIG. 2 without departing from the spirit and scope of the present invention. For example, control unit 150 may include additional memory, such as, for example, a first or second level cache, or one or more application specific integrated circuits (ASICs). Similarly, additional components input/output devices 125 may be coupled to control unit 150 including, for example, image scanning devices, digital still or video cameras, or other devices that may or may not be equipped to capture and/or download electronic data to control unit 150.

Annotation Overview. While the present invention will now be described primarily in the context of audio annotation, those skilled in the art will recognize that the principles of the present invention are applicable to any type of annotation even though described in the context of audio annotation. In accordance with one embodiment, one can record a variable-length audio narration that may be used as an audio annotation for one or more images or objects displayed upon a display device 100. In one embodiment, by indicating a position on a display device 100 through clicking, pointing, or touching the display screen, creation of an annotation is completed and audio recording is initiated. Audio recording may cease when the audio level drops below a predetermined threshold or may cease in response to specific user input. In one embodiment, for each additional positional stimulus received, a new annotation is generated and the previous annotation is complete.

The term "positional stimulus," as referred to herein, represents an input that can simultaneously indicate an electronic location on the display screen and an image or object tracked by the control unit 150. Various input sources may generate a positional stimulus including, without limitation, a computer mouse, a trackball, a stylus or pen 122, and cursor control keys 123. Similarly, a touch screen is capable of both generating and detecting a positional stimulus. In one embodiment, positional stimuli are detected by control unit 150, whereas in another embodiment, positional stimuli are detected by display device 100.

In an exemplary embodiment, once a positional stimulus occurs, such as a "click" of a mouse or a "touch" on a touch screen, an annotation object is generated. The system 103 then receives input or data that comprise the annotation. The input may be a verbal utterance by the user that is converted to an audio signal and recorded. Audio signals may be recorded by control unit 150 through I/O audio device 125 or similar audio hardware (or software), and the audio signal may be stored within data storage device 107 or a similarly equipped audio storage device. In one embodiment, control unit 150 initiates audio recording in response to detecting a positional stimulus, whereas in an alternate embodiment, control unit 150 automatically initiates audio recording upon detecting audio input above a predetermined threshold level. Similarly, audio recording may automatically be terminated upon the audio level dropping below a predetermined threshold or upon control unit 150 detecting a predetermined duration of silence where there is no audio input. In another embodiment, once the audio input for the annotation is complete, the input may be compared to determine a corresponding text equivalent. After the input is complete and/or a text equivalent found, a symbol or text representing the annotation is added to the image at the position of the image of the positional stimulus. For example, in FIG. 11D, symbol annotations 1112, 1114, 1116, 1118 are shown for an annotated image 1100.

The location on an image to which an annotation is graphically connected may be represented by (x, y) coordinates in the case of a graphical image, or the location may be represented by a single coordinate in the case where an image represents a linear document. Examples of linear documents may include a plain text document, a hypertext markup language (HTML) document, or some other markup language-based document including extensible markup language (XML) documents.

In one embodiment, if during audio recording the system detects an additional positional stimulus, control unit 150 generates an additional annotation object. The additional annotation object may be generated in a manner similar to the first annotation object described above. It should be understood that an additional positional stimulus need not be on the same image or object, but could be on any other object or area visible on the display device 100.

In another embodiment, if the positional stimulus is detected upon text or a symbol representing an annotation, the control unit 150 retrieves the audio annotation from the annotation object corresponding to the symbol or text and outputs the signal via the I/O audio output device 125. Such may be necessary when the text does not match the annotation or where there is only an audio annotation with no text translation.

In yet another embodiment, the text or a symbol representing an annotation object may be repositioned individually or as a group relative to the images shown on the display device 100 using conventional "drag" operations. For such operations, the user either sets the system 103 in an editing mode of operation, or a different positional stimulus (e.g., right mouse click or double tap gesture) is recognized by the control unit 150 to initiate such a drag and drop operation. For example, FIGS. 11C and 11D show annotations as text 1102, 1104, 1106 and 1108; and symbols 1112, 1114, 1116 and 1118 respectively.

Figure 3:
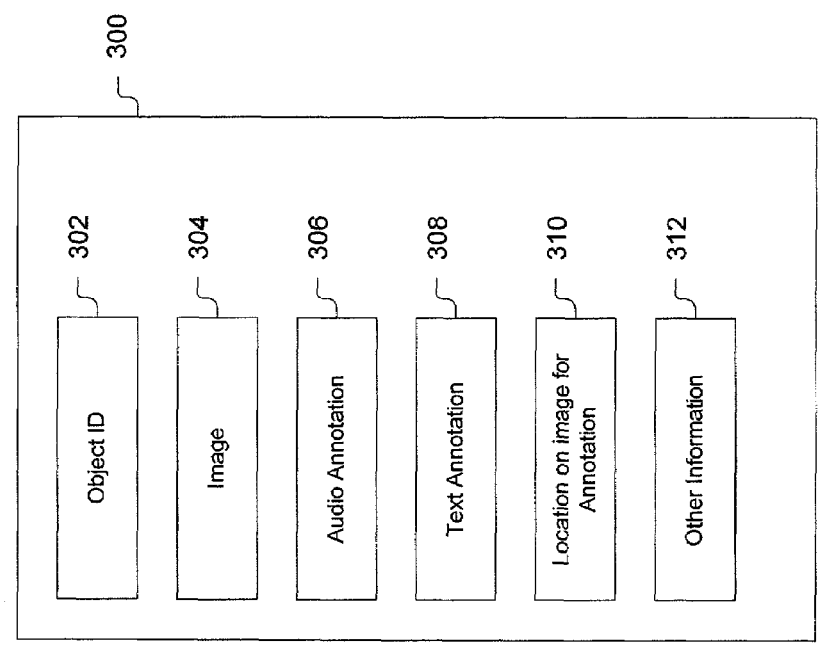
FIG. 3 illustrates a block diagram of a preferred embodiment of a data structure for message objects in accordance with the present invention.

Annotation Object. Referring now to FIG. 3, portions of an annotation object data structure 300 relevant to the present invention are shown. The present invention uses annotation objects 300 to represent annotations to images or objects. For each annotation, the present invention provides an annotation object 300 having a variety of fields and attributes. In order to provide for much of the annotation and display of annotations provided by the present invention, each annotation object 300 preferably has fields including: an object identification field 302, a image field 304, an audio annotation field 306, text annotation field 308, a location field 310 and a miscellaneous field 312 for storing other data used in the methods described below. The object identification field 302 is used to provide each annotation object with a unique identification number. The image field 304 is used to store an image or a reference to the image that is being annotated. The audio annotation field 306 is used to store an audio recording of the annotation. This field may store the actual audio signal or a pointer to a file having the actual audio signal. The audio signal may be in any one of various formats for audio data including both compressed and uncompressed formats. The text annotation field 308 is used to store any type of graphical annotation, and text is used as term for convenience. The text annotation field 308 may store a non-text symbol, a reference to a region of the image, or any number of other graphical images. This text annotation is preferably substantively the graphical equivalent of the audio annotation. As will be described in more detail below, the text annotation may be derived from the audio annotation or based on separate input from the user. The location field 310 is used to store a location for display of the annotation or a symbol representing the annotation. The location is preferably a relative position, relative to the image being annotated. The miscellaneous field stores other data used in the methods described below. Some objects might be cached so that if the information pointed to with the source changes, the cached object is still available.

Annotation System. Referring now to FIG. 2, the memory unit 104 is shown in more detail. In particular, the portions of the memory 104 needed for the annotation processes of the present invention are shown and will now be described more specifically. As shown in FIG. 2, the memory unit 104 preferably comprises an operating system 202, an image display system 204, a web browser 206, an annotation display module 208, a direct annotation creation module 210, an annotation audio output module 212, an audio vocabulary comparison module 214, an audio vocabulary storage 216, a dynamic vocabulary updating module 218, and a media object cache 220. As noted above, the memory unit 104 stores instructions and/or data that may be executed by processing unit 102. The instructions and/or data may comprise code for performing any and/or all of the techniques described herein. These modules 202-220 are coupled by bus 101 to the processing unit 102 for communication and cooperation to provide the system 103 for annotation. Those skilled in the art will recognized that while the present invention will now be described as modules or portions of a memory unit 104 of a computer system, the modules or portions may also be stored in other media such as permanent data storage device 107 and may be distributed across a network having a plurality of different computers such as in a client/server environment.

The operating system 202 is preferably one of a conventional type such as, WINDOWS®, SOLARIS® or LINUX® based operating systems. Although not shown, the memory unit 104 may also include one or more application programs including, without limitation, word processing applications, electronic mail applications, spreadsheet applications, and web browser applications.

The image display system 204 is preferably a system for displaying and storing media objects. The image display system 204 generates image of the object on the display device 100. The objects are preferably graphic images, but may also be icons or symbols representing documents, text, video, graphics, etc. Such media objects are stored in the memory unit 104 in media object cache 220 or in the data storage device 107 (FIG. 1). The image display system 204 may be any one of various prior art systems that at a minimum enables the display of images on the display device 100. For example, the image display system 204 may be a multimedia messaging system developed by Ricoh Innovations, Inc. of San Mateo and Menlo Park, Calif. The image display system 204 is preferably a computer or server that includes programs and routines for providing a display functionality. For example, the server could be a web server that stores messages (XML+ related/referenced media objects) and makes the messages accessible to others via HTTP. The image display system 204 also includes functionality to receive commands from the processor 102 and input devices 122, 123 and send the commands to other modules 208-220 in the memory to manage the direct, multi-modal annotation process.

Today, it is well understood by those skilled in the art that multiple computers can be used in the place of a single computer by applying the appropriate software, hardware, and communication protocols. For instance, data used by a computer often resides on a hard disk or other storage device that is located somewhere on the network to which the computer is connected and not within the computer enclosure itself. That data can be accessed using NFS, FTP, HTTP or one of many other remote file access protocols. Additionally, remote procedure calls (RPC) can execute software on remote processors not part of the local computer. In some cases, this remote data or remote procedure operation is transparent to the user of the computer and even to the application itself because the remote operation is executed through the underlying operating system as if it was a local operation.

It should be apparent to those skilled in the art that although the embodiment described in this invention refers to a single computer with local storage and processor, the data might be stored remotely in a manner that is transparent to the local computer user or the data might explicitly reside in a remote computer accessible over the network. In either case, the functionality of the invention is the same and both embodiments are recognized and considered as possible embodiments of this invention.

For example, FIG. 2 shows the image display system 204 that is described as running in memory unit 104. However, memory unit 104 could be a virtual memory unit and bus 101 could be a virtual bus. In other words, the processes and data that represent image display system 204 could reside and execute on a separate computer that is part of the network that makes up memory unit 104. The bus 101 would then be the network hardware and protocols that allow each component of memory unit 104 to communicate. The overall operation of the system is unaffected by the location of the data or process execution—particularly when it is done transparently to the user or the application.

The web browser 206 is of a conventional type that provides access to the Internet and processes HTML, XML or other mark up language to generated images on the display device 100. For example, the web browser 206 could be Netscape Navigator or Microsoft Internet Explorer.

The annotation display module 208 is coupled to the bus 101 for communication with the image display system 204, the web browser 206, the direct annotation creation module 210, the audio vocabulary comparison module 214, the dynamic vocabulary updating module 218, and the media object cache 220. The annotation display module 208 interacts with these components as will be described below with reference to FIGS. 4-10 to generate symbols or text representing the annotation objects on the display device 100. The annotation display module 208 interacts with the image display system 204 and the direct annotation creation module 210 to provide user feedback as to the existence of an annotation by showing a symbol or text on the display device 100 proximate or associated with an image being annotated based on the location stored in the annotation object. The annotation display module 208 interacts with the media object cache 220 to retrieve the information used to create the image, symbol or text. The annotation display module 208 also interacts with the image display system 204 and the direct annotation creation module 210 to provide text where the annotation object includes text data, a symbol or icon to represent the annotation object that includes audio data, and another symbol or icon to represent an the annotation object that contains no annotation data. The annotation display module 208 also interacts with the audio vocabulary comparison module 214 and the dynamic vocabulary updating module 218 to present close text matches to audio input, text annotation windows, and other control and status information.

The direct annotation creation module 210 is coupled to the bus 101 for communication with the image display system 204, the annotation display module 208, the audio vocabulary comparison module 214, the dynamic vocabulary updating module 218, and the media object cache 220. The direct annotation creation module 210 interacts with these components as will be described below with reference to FIGS. 4-10 to generate an annotation object in response to user input. More specifically, the direct annotation creation module 210 generates an instance of the annotation objects of FIG. 3 (See above). The direct annotation creation module 210 interacts with the image display system 204 to receive commands, and the annotation display module 208 to provide visual feedback as to annotation objects that are created. The direct annotation creation module 210 also interacts with the audio vocabulary comparison module 214 to compare audio input to an existing vocabulary of annotation during the process of creating an annotation object. This comparison may result in the presentation of a text match or likely text matches for acceptance by the user. The direct annotation creation module 210 also interacts with the dynamic vocabulary updating module 218 to allow the user to add to the vocabulary during the annotation object creation process. The functionality provided by the direct annotation creation module 210 is described in detail in FIGS. 4-10.

The annotation audio output module 212 is similar to the annotation display module 208, but for outputting audio signals. The annotation audio output module 212 is coupled to the bus 101 for communication with the image display system 204, the web browser 206 and the media object cache 220. The annotation audio output module 212 interacts with these components as will be described below with reference to FIGS. 4-10 to generate audio output in response to user selection of an annotation symbol representing an annotation object on the display device 100. The annotation audio output module 212 interacts with the image display system 204 to receive user input and commands. The annotation audio output module 212 interacts with the media object cache 220 to retrieve the audio signal stored as an annotation and output the signal to the user via the audio input/output device 125. The annotation audio output module 212 can also interact with the audio vocabulary comparison module 214 and the dynamic vocabulary updating module 218 to present audio output of close matches and existing vocabulary phrases in response to user requests.

The audio vocabulary comparison module 214 is coupled to the bus 101 for communication with the image display system 204, the web browser 206, the annotation display module 208, the direct annotation creation module 210, the audio vocabulary storage 216 and a media object cache 220. The audio vocabulary comparison module 214 interacts with these components as will be described below with reference to FIGS. 4-10 to determine whether there are any existing text annotations that match the audio input. The audio vocabulary comparison module 214 receives audio input from the image display system 204 or the direct annotation creation module 210 during the annotation creation process. The audio vocabulary comparison module 214 compares the received audio signal to signals stored in the audio vocabulary storage 216. The audio vocabulary comparison module 214 identifies matches and close matches, and then interacts with the image display system 204 and the annotation display module 208 to present them to the user to be added to the annotation being created. Once approved by the user, the audio vocabulary comparison module 214 passes matching text to the direct annotation creation module 210 for addition to the annotation object.

The audio vocabulary storage 216 is coupled to the bus 101 for communication with the audio vocabulary comparison module 214. The audio vocabulary storage 216 preferably stores a plurality of audio signals and corresponding text strings. The audio vocabulary storage 216 is preferably a table of such audio signals and text strings. The audio vocabulary storage 216 includes a database of text and associated audio signals that is searchable for matching. The audio vocabulary storage 216 preferably orders the audio for searching efficiency. The audio vocabulary storage 216 can be augmented as new annotations are added to the system 103.

The dynamic vocabulary updating module 218 is coupled to the bus 101 for communication with the image display system 204, the web browser 206, the annotation display module 208, the direct annotation creation module 210, the audio vocabulary storage 216 and a media object cache 220. The dynamic vocabulary updating module 218 interacts with these components as will be described below with reference to FIGS. 4-10 to add new text annotations that have an associated audio signal into the audio vocabulary storage 216. The dynamic vocabulary updating module 218 receives audio input from the image display system 204 or the direct annotation creation module 210 during the annotation creation process. If the audio vocabulary comparison module 214 is unable to find a match or close match, the dynamic vocabulary updating module 218 working with the annotation display module 208 displays an interface for the user to create a new entry in the audio vocabulary storage 216 based upon the annotation being created. In response to input from the user, the dynamic vocabulary updating module 218 creates and stores new audio signal text string pairs in the audio vocabulary storage 216.

The media object cache 220 forms a portion of memory 104 and temporarily stores media and annotation objects used by the annotation system 103 for faster access. The media object cache 220 stores media objects identical to those stored on the data storage device 107 or other storage devices accessible via the network controller 124. By storing the media objects in the media object cache 220, the media objects are usable by the various modules 202-218 with less latency.

Figure 4:
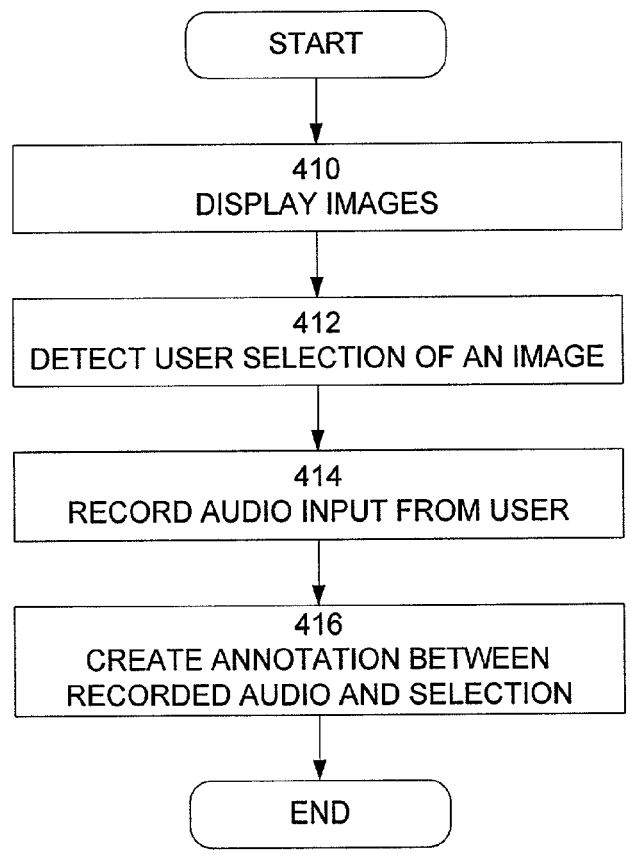
FIG. 4 is a flow chart of a preferred method for directly annotating objects.

Annotation Processes. Referring now to FIGS. 4-10, a number of embodiments of the method for direct annotation will be described. The annotation process of the present invention is particularly advantageous because it provides for easy annotation of images with a "point and talk" methodology. Referring now to FIG. 4, a preferred method for directly annotating objects is shown. The method begins with the display 410 of a plurality of images on the display device 100 by the image display system 204. Then the method detects 412 user selection of an image. The user preferably selects an image by providing a positional stimulus, such as a "click" of a mouse or a "touch" on a touch screen. The position of the positional stimulus is received as part of this detection step 412 and determines the images for which an annotation will be created. The position of the positional stimulus can also be used as a point to display feedback to user that an annotation has been created. Then the system receives input 414 from the user. The input is preferably in the form of audio received by the audio input device 125 that is converted to a signal and sent to direct annotation creation module 210. Then the direct annotation creation module 210 creates an annotation between the audio input and the selected image. For example, annotation is created by direct annotation creation module 210 generating 416 a new annotation object, and storing 1) a reference to the image identified in selection step in the image field 304, 2) the audio signal received in the audio field 306, and the 3) location of the positional stimulus in the location field 310.

Figure 5:
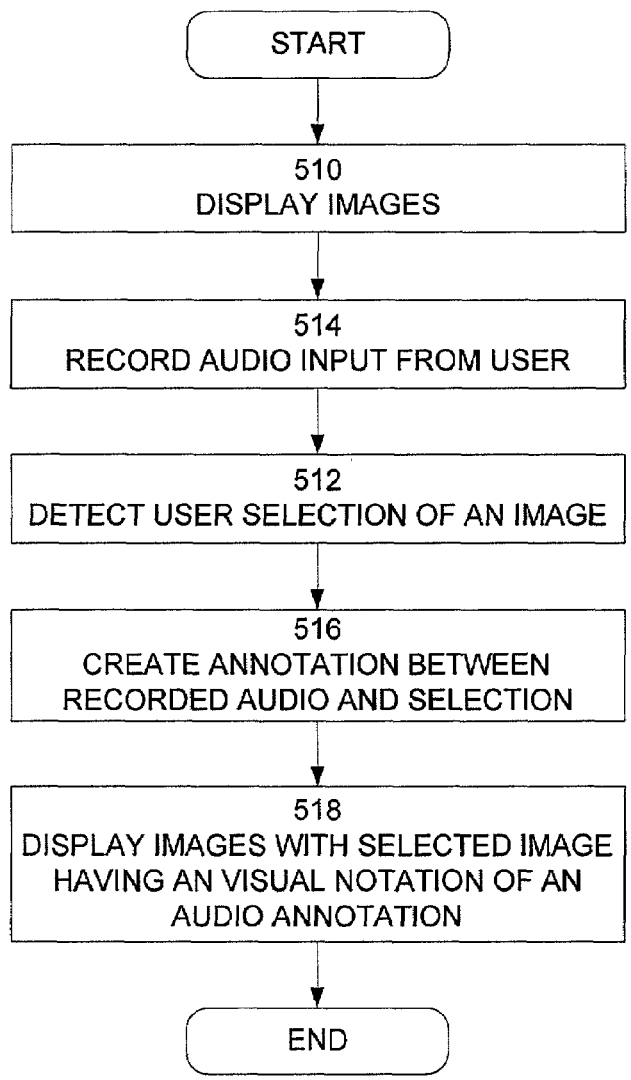
FIG. 5 is a flow chart of a preferred method for directly annotating objects including confirming display of an annotation.
Figure 11A:
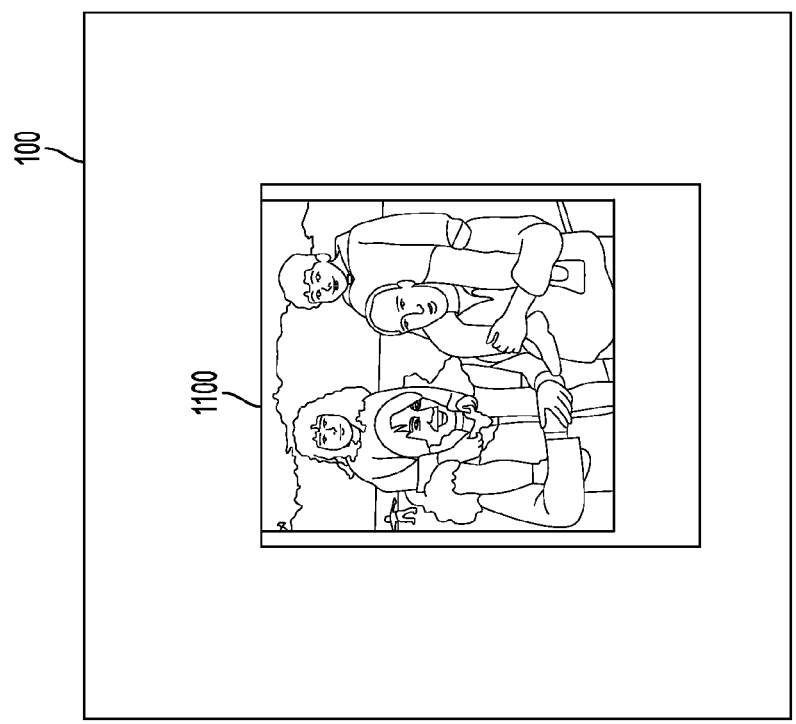
FIGS. 11A-11F are graphical representations of a preferred embodiment of the user interface at different times in the direct annotation process.
Figure 11B:
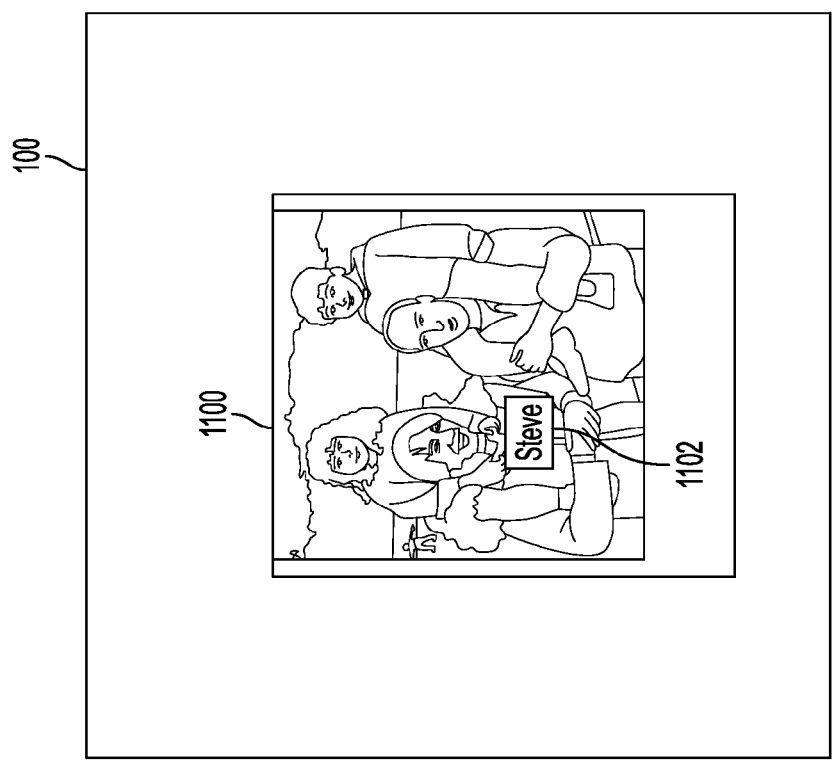
Figure 11C:
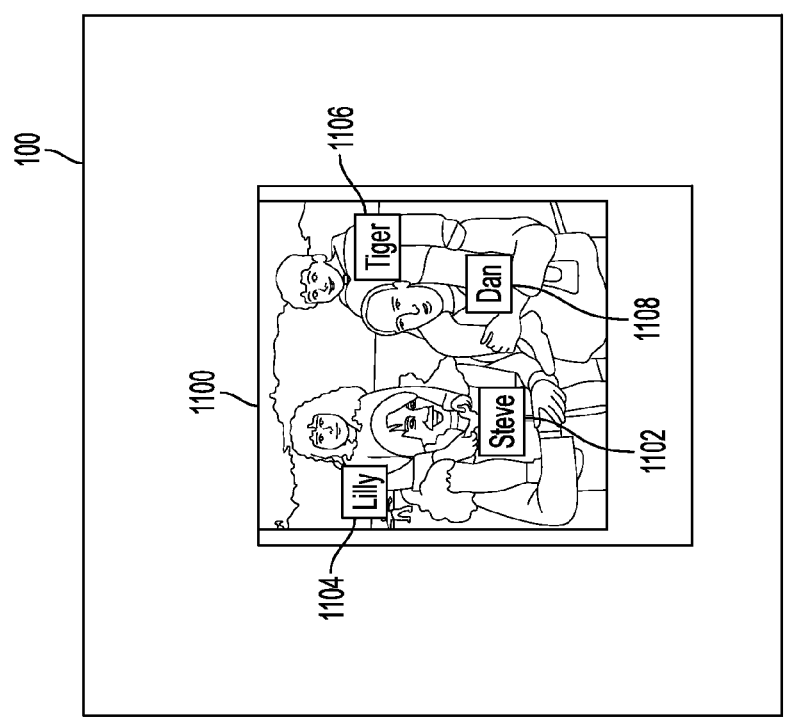
Figure 11D:
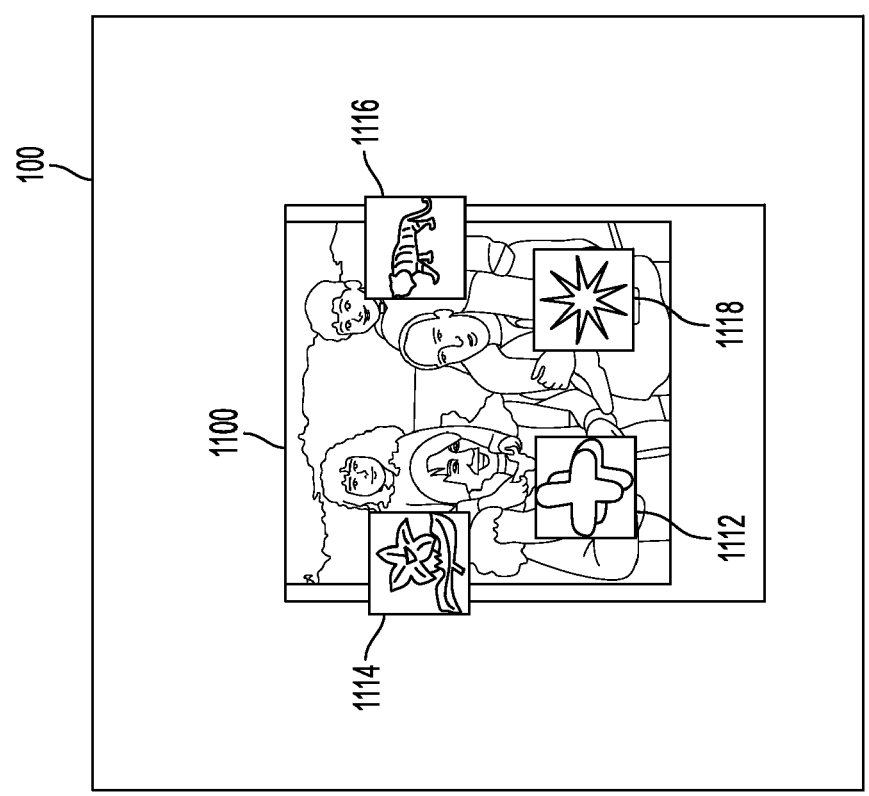

Referring now to FIGS. 5, 11A and 11B, another embodiment of the method for directly annotating objects will be described. The embodiment in FIG. 5 illustrates that annotation process is independent of the order in which the audio input and selection steps occur. FIG. 5 also highlights how visual feedback that an annotation has been created can be provided to the user. The process begins with the display 510 of one or more images on the display device 100 by the image display system 204. For example, FIG. 11A illustrates the display device 100 presenting a single image 1100 portraying four people prior to any annotation. Although only a single image is displayed in FIG. 11A for illustration purposes, is should be apparent that the present invention may be used when several different images are displayed simultaneously. Then the method receives and records input 514 from the user. The input is preferably in the form of audio input received by the audio input device 125 that is converted to a signal and sent to direct annotation creation module 210. The audio input is temporarily stored in an available portion of memory unit 104. Next, the system 103 detects 512 a user selection of an image or an image portion. Again, the position of the positional stimulus is received and determines the images that will be annotated and the position for displaying a representation of the annotation. For the example show in FIG. 11A, the user taps or places the cursor over and click upon the person in the lower, left-hand corner of the image. Then the direct annotation creation module 210 creates an annotation between the audio input and the selection. Generation of an annotation object with a unique identification number includes: storing the audio signal received in step 514 in the audio field 306 of the new annotation object; storing a reference to the image identified in selection step 512 in the image field 304; and storing the location of the positional stimulus identified in selection step 512 in the location field 310. Finally, the images are displayed with the selected image having a visual notation that an audio annotation exists. The visual notation is preferably an icon or other symbol displayed at the location stored in the annotation object. The image display system 204 working with the annotation display module 208 generates the display of the image with the annotation. An exemplary result is shown in FIG. 11B, where the annotation 1102 including the text "Steve" has been created and added to over the image. It is preferably positioned where the user provided selection input to the system. Moreover, as shown in FIG. 11C, an image may have several annotations 1102, 1104, 1106 and 1106 by performing the above process repeatedly.

Figure 6:
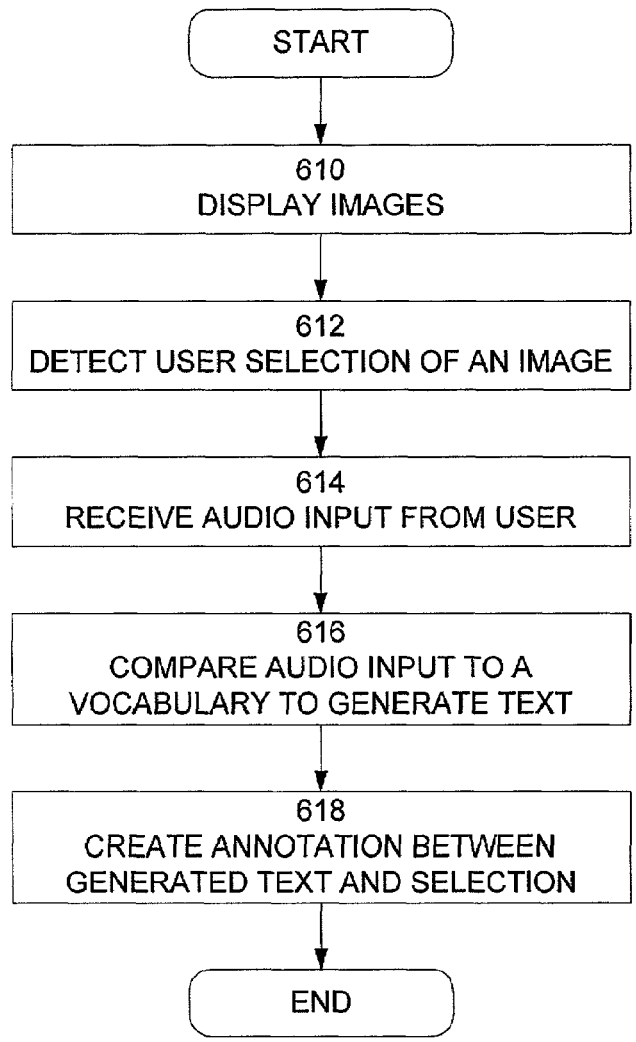
FIG. 6 is a flow chart of a preferred method for directly annotating objects including a vocabulary comparison.

FIG. 6 illustrates another embodiment of the method for directly annotating objects that includes translating the audio input into text. The system 103 displays 610 images, and detects 612 the selection of an image by the user as has been described above with reference to FIGS. 4 and 5. Then the system 103 receives 614 audio input from the user via the audio input device 125. It is important to note that the system 103 does not need to record the audio input, as it can be immediately translated into text. As the audio input is received 614, the audio vocabulary comparison module 214 compares 616 the input audio signal to those signals stored in the audio vocabulary storage to find a match and retrieve the text associated with the match. The comparison may be performed using template matching or Hidden Markov Models. For example, the audio vocabulary comparison module 214 may be a voice recognition engine such as those provided in ViaVoice by IBM, Dragon Naturally Speaking by Lernout & Hauspie, or Sphinx by the Sphinx Group at Carnegie Mellon University. Finally, an annotation object is generated 618 by the direct annotation creation module 210 and stored in the media object cache 220. The new annotation object has a unique identification number stored in the object identification field 302, a reference to the image identified in selection step stored in the image field 304, the text produced by the comparison step 616 stored in the text annotation field 308, and the location of the positional stimulus from the selection step 612 stored in the location field 310. This embodiment of the present invention is particularly advantageous for applications where memory is at a premium. Rather that having to store the audio signal, the annotation system can be limited to text annotations. This greatly reduces the amount of memory required for processing and for the system 103 in general.

Figure 7:
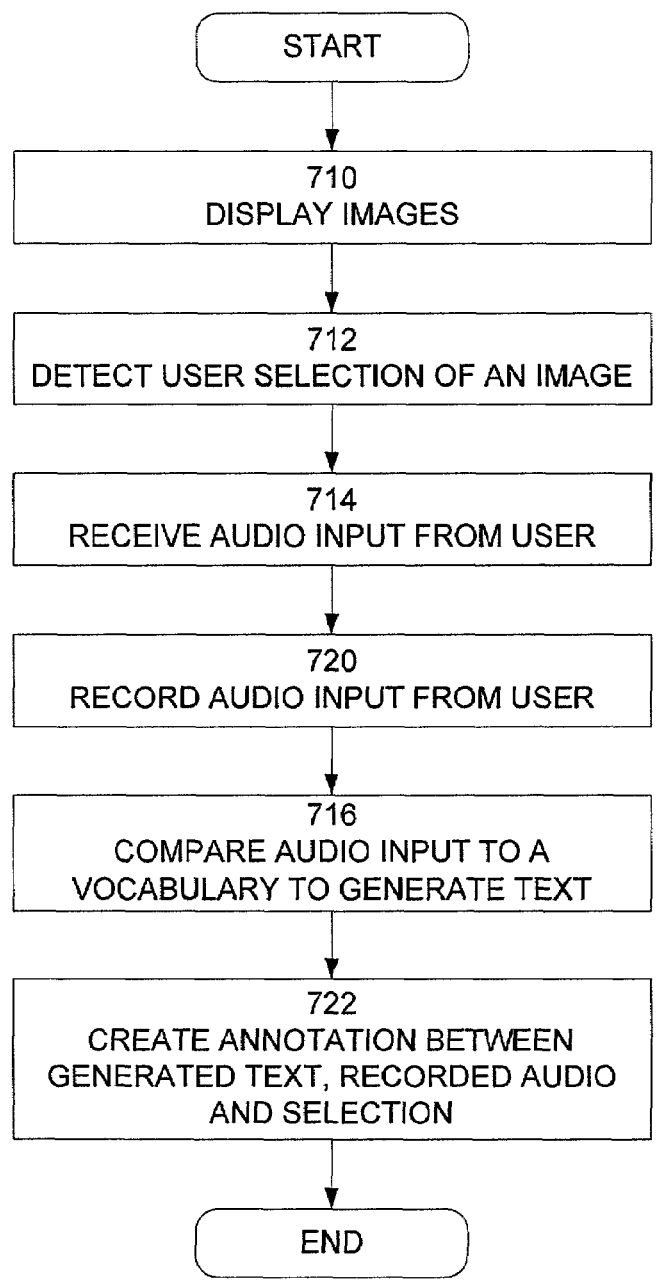
FIG. 7 is a flow chart of a preferred method for directly annotating objects including appending audio recording and an annotation.

Referring now to FIG. 7, another embodiment of the method for directly annotating objects is shown. The method of FIG. 7 is very similar to that of FIG. 6, but also includes the steps of recording the input audio signal, and storing it in the annotation object. The method of FIG. 7 begins with the same first three steps as FIG. 6, namely, displaying 710 images, detecting 712 user selection of an image, and receiving 714 audio input from the user. Next in step 720, the system 103 records the audio input from the user. This can be done in a temporary file in memory unit 104, or to a more permanent file on the data storage device 107. Then the method compares 716 the recorded audio to the entries in the audio vocabulary storage 216 using the audio vocabulary comparison module 214. The comparison produces a text match or close match. Then an annotation object is generated in step 722. The annotation object includes a reference to the image identified in step 712 in the image field 304, the audio signal recorded in step 720 or a reference to it in the audio annotation field 306, the text produced by the comparison step 716 in the text annotation field 308, and the location of the positional stimulus from step 712 store in the location field 310.

Figure 8A:
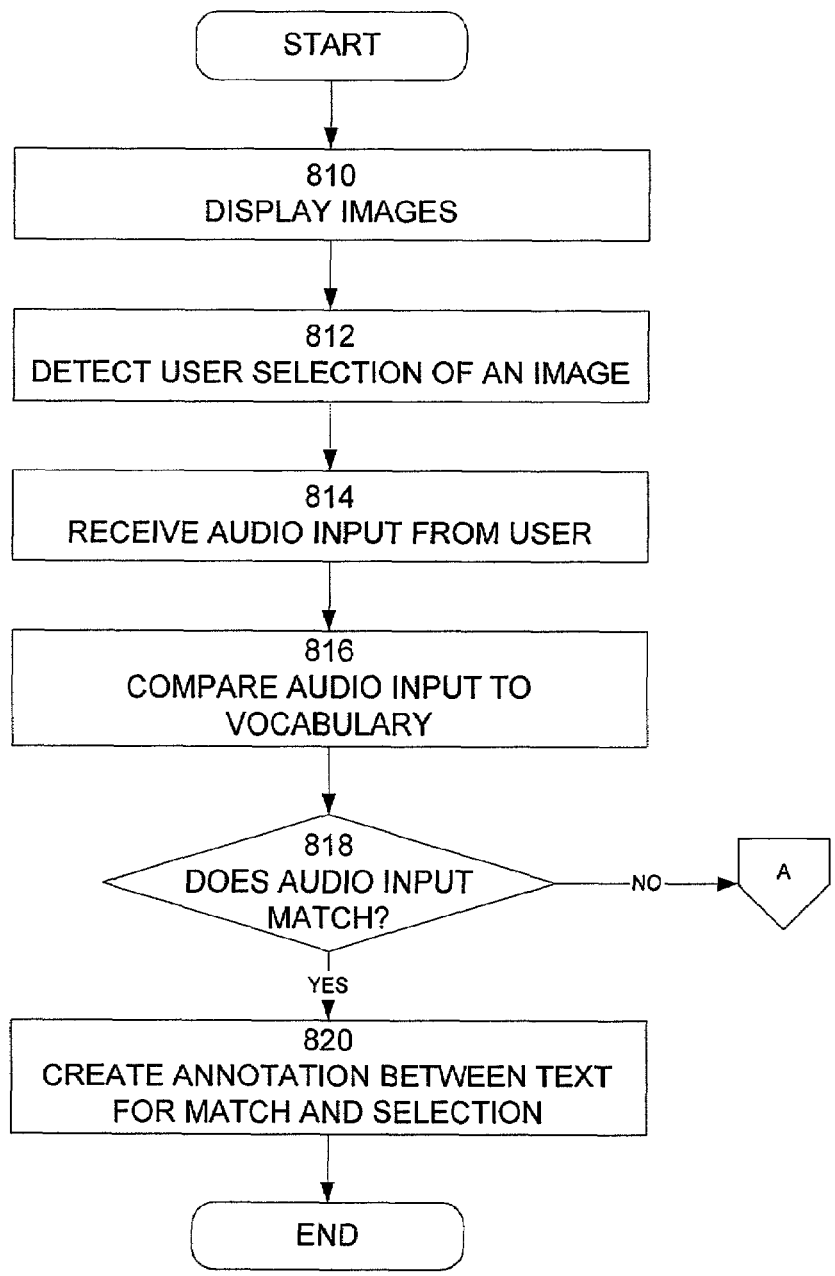
FIG. 8 is a flow chart of a preferred method for directly annotating objects including presenting possible annotations.
Figure 8B:
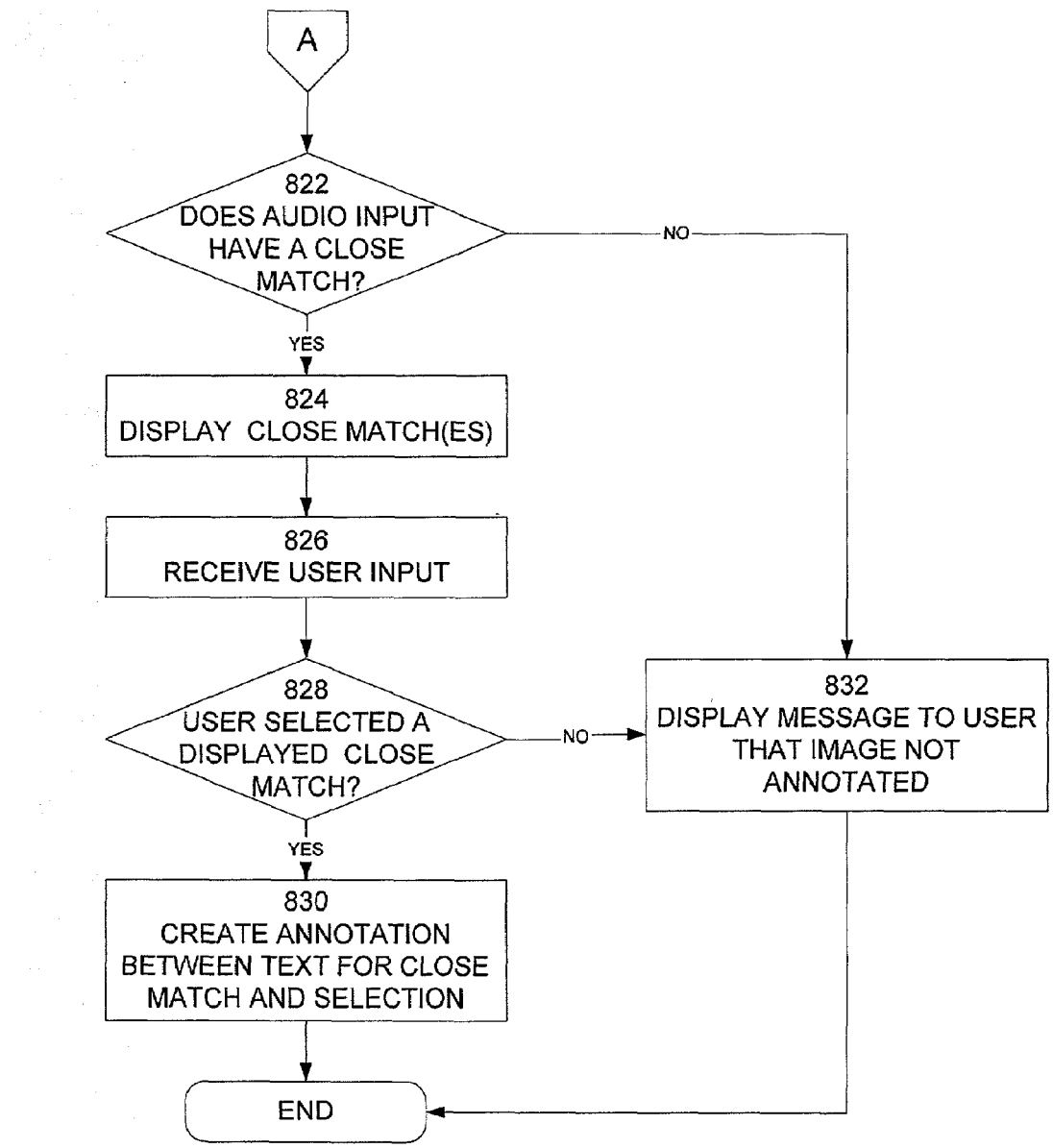
Figure 11E:
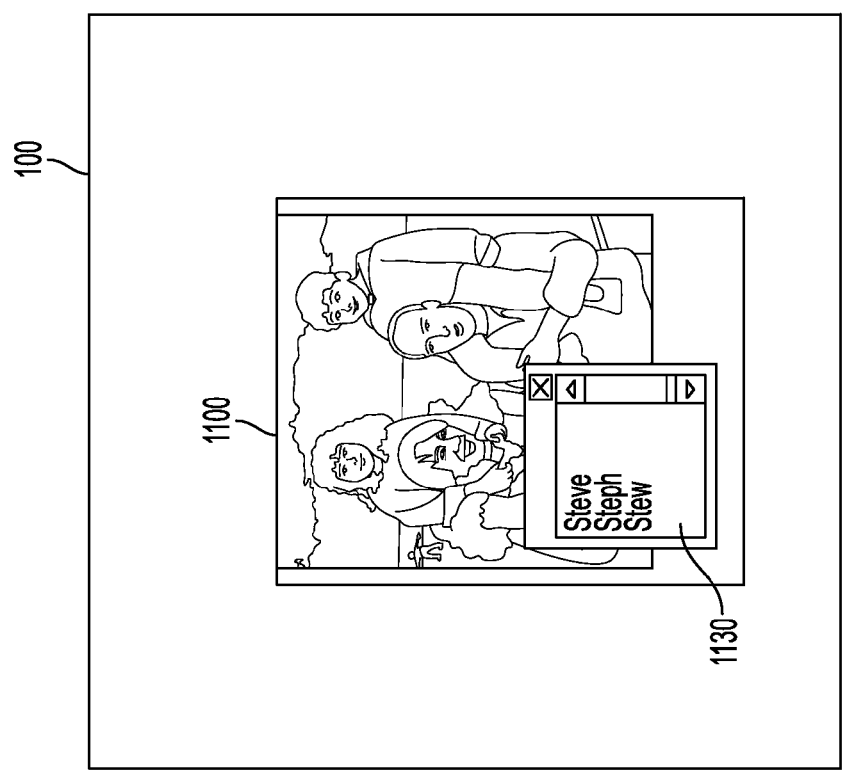

FIGS. 8A and 8B are a flow chart of a preferred method for directly annotating objects including presenting text annotations similar to the audio input. The method begins in step 810 by displaying one or more images on the display device 100. The system 103 then detects 812 selection of one of the displayed images. This detection identifies an image and a position or selection point. Then the system 103 receives 814 audio input. The audio input is compared 816 to audio signals in the audio vocabulary storage 216. The method then tests 818 whether the comparison of step 816 had yielded a match. For example, a match is determined to exist by calculating a probability metric and setting a threshold to be greater than 80% or 90% for a match to be found. If a match is found, the method continues in step 820 to create an annotation object using the text for the match, the selection and image information as has been described above in FIGS. 6 and 7. On the other hand if a match is not found to exist the method continues in step 822 of FIG. 8B. In step 822, the method determines whether there is a "close" match to the audio input in the audio vocabulary storage 216. By way of example, a "close" match exists if the probability metric is above 50%. If there is at least one "close" match, then the text or symbolic information associated with the close match(es) is retrieved from the audio vocabulary storage 216 by the audio vocabulary comparison module 214 and output 824 on the display device 100 by the image display system 204. For example, a window 1130 such as shown in FIG. 11E can be used to present close matches to the user. In an alternate embodiment, the output of close matches may also be by playing the recorded audio from the audio vocabulary storage 216 for each close match. Then the user inputs, and the system 103 receives 826 a selection of one of the presented text strings. Next, the method tests 828 whether the user selected one of the presented close matches. If so, the method proceeds to step 830 where an annotation object is created using the selected, close match text string. Although not shown, after either step 830 or 820, a representation of the annotation object could be displayed with the image. Such an example is shown using symbols 1112, 1114, 1116 and 1118 in FIG. 11D. If the user did not select a close match in step 828 or the audio input did not have a close match in step 822, the system 103 displays a message to the user that the image has not been annotated before ending.

Figure 9A:
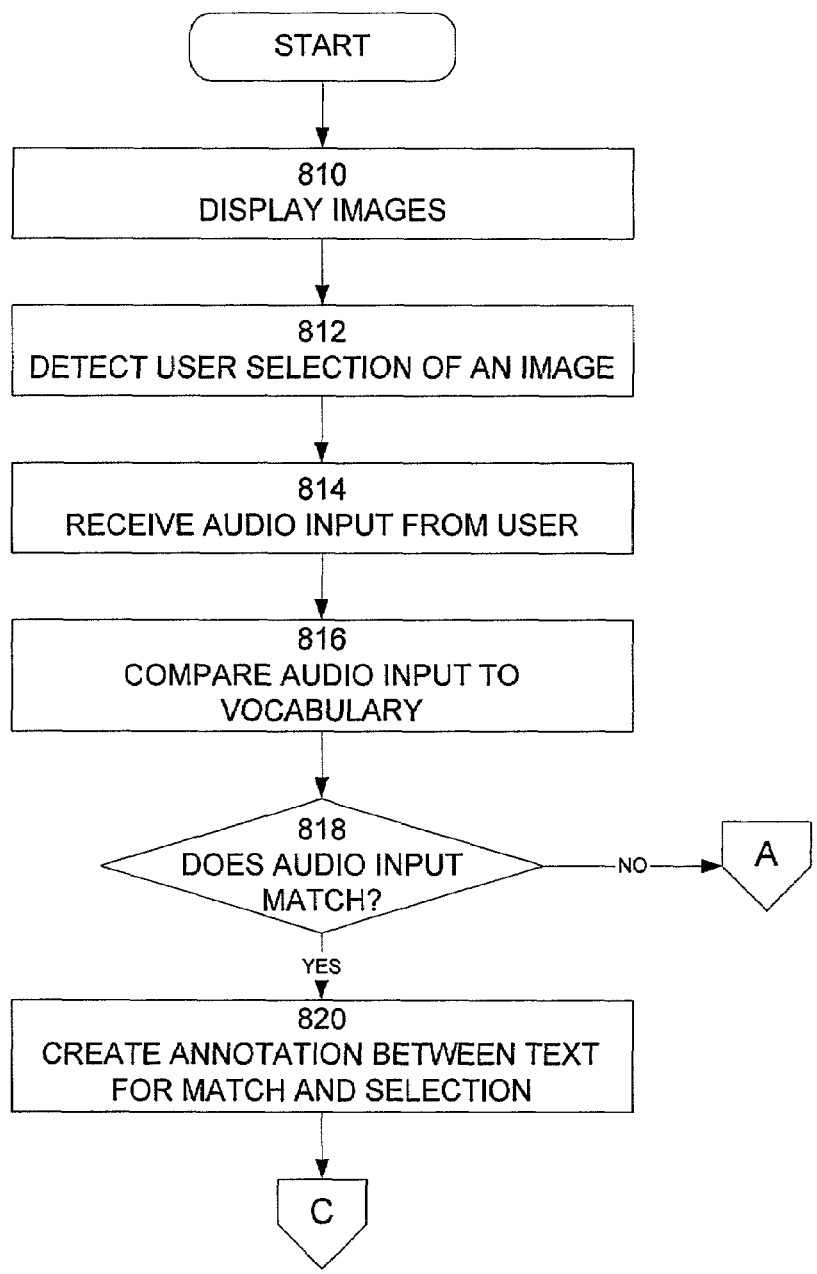
FIG. 9 is a flow chart of a preferred method for directly annotating objects including dynamically adding to a vocabulary database.
Figure 9B:
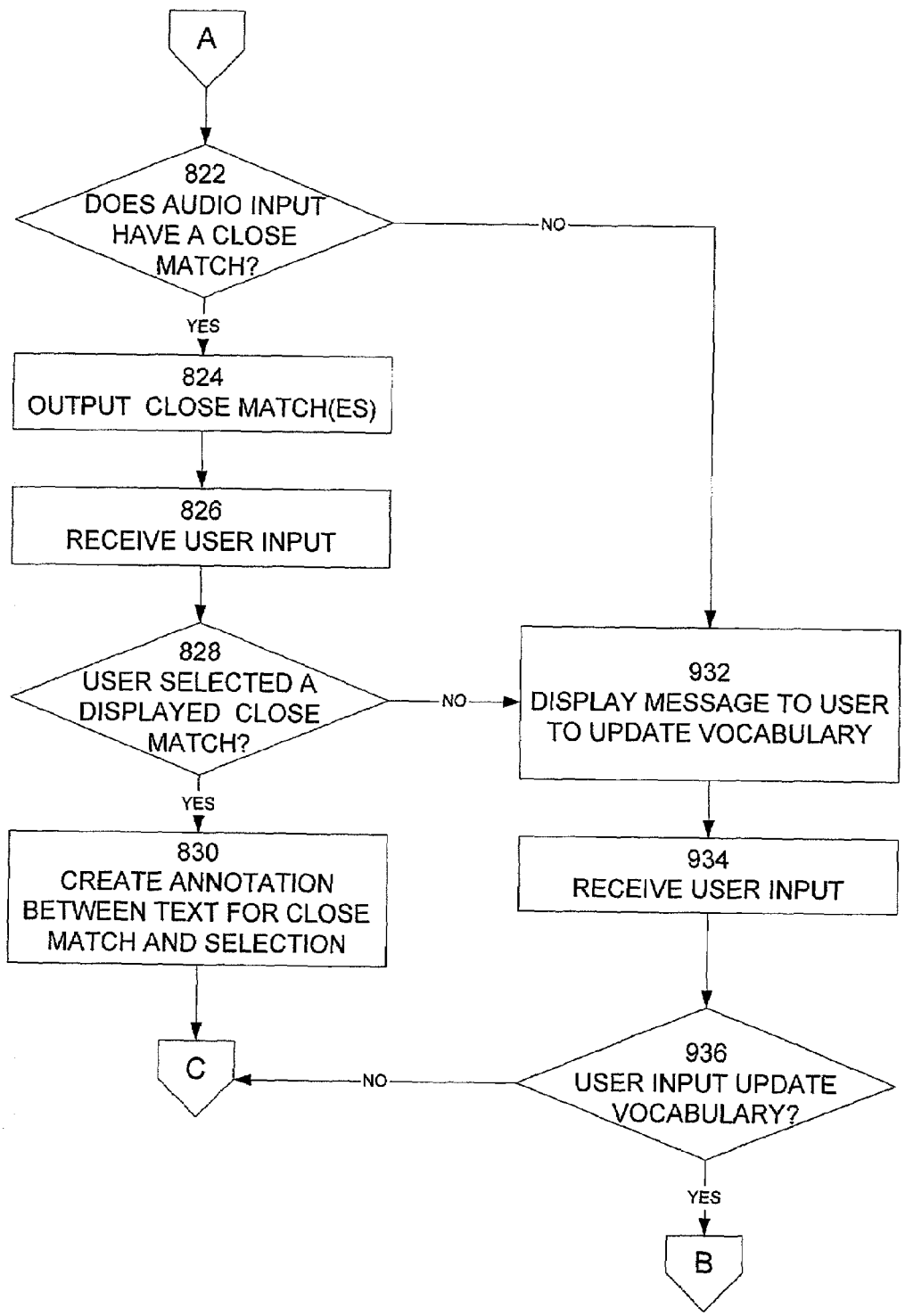
Figure 9C:
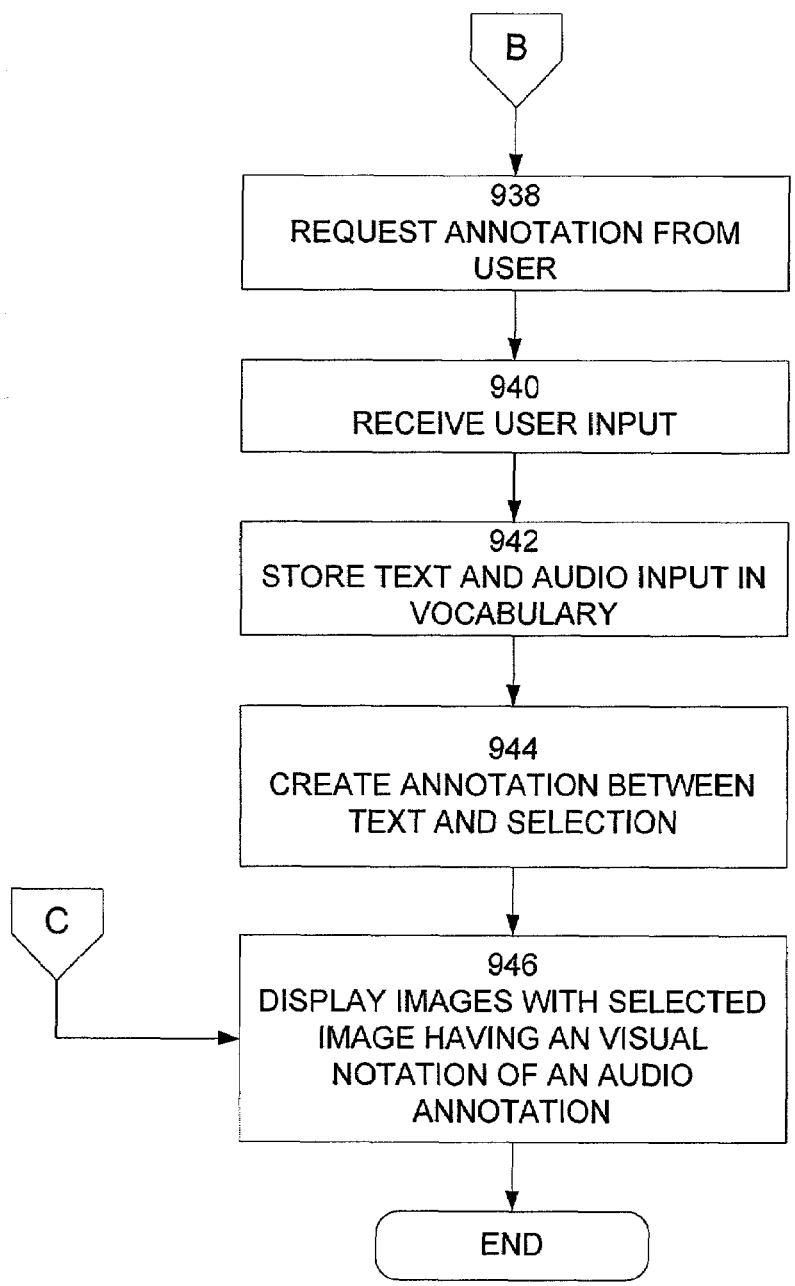

Referring now to FIGS. 9A-9C, the method for directly annotating objects including dynamically adding to a vocabulary database will be described. Many of the steps of this embodiment are identical to the steps of FIGS. 8A and 8B. Thus, like reference numerals have been used for similar functionality. The method begins by display images, receiving input and testing for matches as has been described above for steps 810-830. However, in this embodiment, the step of presenting visual feedback regarding the creation of an annotation is specifically provided for in step 946 after a match has been found (step 820) or the user has selected a close match (step 830).

Figure 11F:
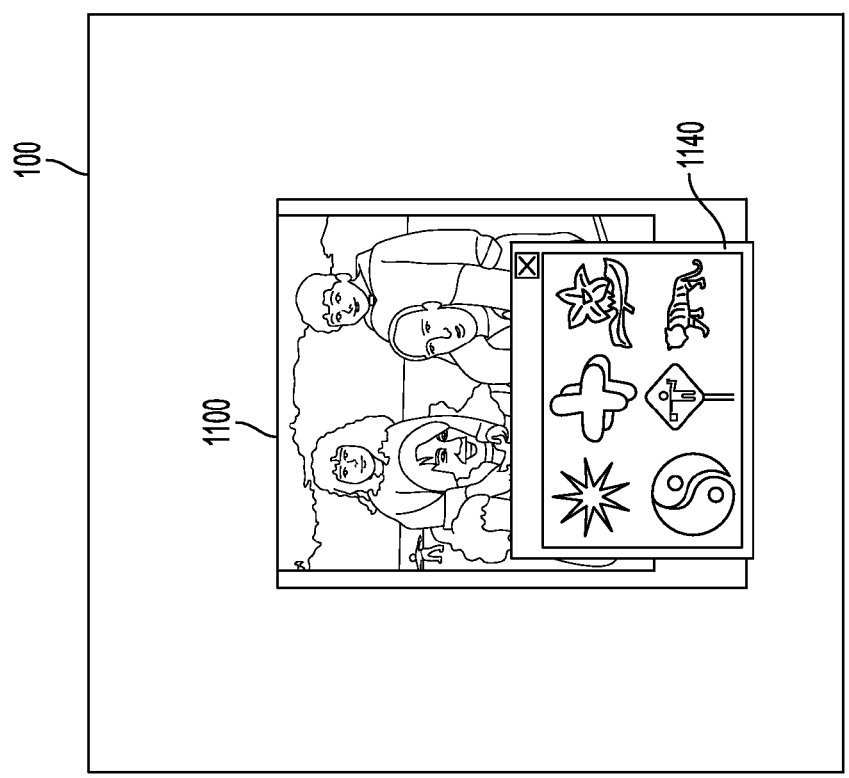

A more significant modification from FIGS. 8A and 8B, are the transitions upon determining that the audio input does not have a close match (step 822) or the user has not selected a close match (step 828) in FIG. 9B. After either step 822 or step 828, the method continues to step 932, where the system 103 displays a query as to whether the user wants to update the audio vocabulary. In step 934, the system receives the user's response. The system may also present a window 1130 on the display device 100. The window 1130 is for inputting text that is to be added to the audio annotation, as illustrated in FIG. 11E. In an alternate embodiment shown in FIG. 11F, the system may provide symbol representations 1112, 1114, 1116, 1118 of the annotations, and provide a different window 1140 for selecting a matching image, providing text for an annotation or to replace a symbol. And in step 936, the system 103 tests whether the user wants to update the vocabulary. If not, the method continues to step 946 to display the created annotation object using a predefined icon. If the user has chosen to update or add to the vocabulary, the method proceeds from step 936 to step 938 of FIG. 9C. In step 938, the system displays a graphical user interface and requests a text annotation from the user. The user inputs data using a keyboard 122, a cursor control 123 or any other mechanism. Then in step 942, the received text and the audio input are stored as a new entry in the vocabulary storage 216. The system then creates 944 an annotation object using the text, the audio input and the selected image and position. The newly created annotation object is displayed 946 to complete the process.

Figure 10:
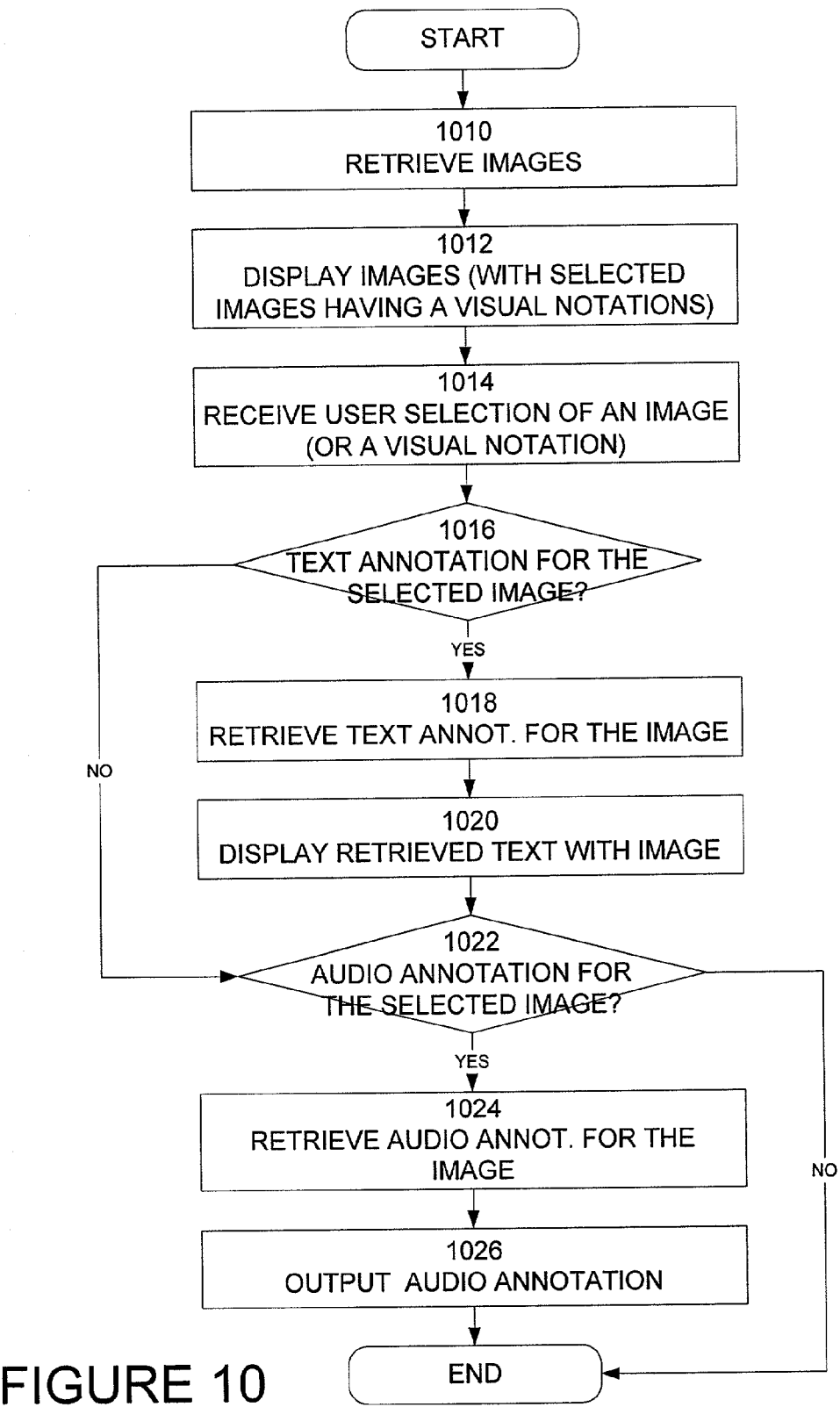
FIG. 10 is a flow chart of a preferred method for displaying objects that have been annotated.

Referring now to FIG. 10, a preferred method for viewing objects that have been annotated will be described. The method starts by retrieving 1010 images. Then the system 103 displays images with the images having annotations shown in a visually distinct manner. For example, the images with annotation may be shown with an icon representing the annotation. The user may the selected an images or a visual notation on an image. In response, the system receives 1014 a user selection of an image. The method then determines 1016 whether the image has a text annotation. If the system 103 has a text annotation, the text annotation field 308 will not be empty. If the system 103 has a text annotation, the system retrieves 1018 the text annotation from the object corresponding to the annotation, and displays 1020 the retrieved text on the display device proximate the icon. If there is not a text annotation as determined in step 1016 or after step 1020, the method determines 1022 if there is an audio annotation. If there is an audio annotation then the method retrieves the audio annotation corresponding to the image in step 1024 and outputs the audio annotation in step 1026. After either step 1022 or step 1026 the method is complete. Those skilled in the art will recognize that the user may be provided with different input commands during the viewing process such that during step 1014 the user can input different commands. A first command that cause the system to perform steps 1016-1020 to output the text annotation and a second command that causes the system to perform steps 1022-1026 to output the audio annotations.

Figure 12:
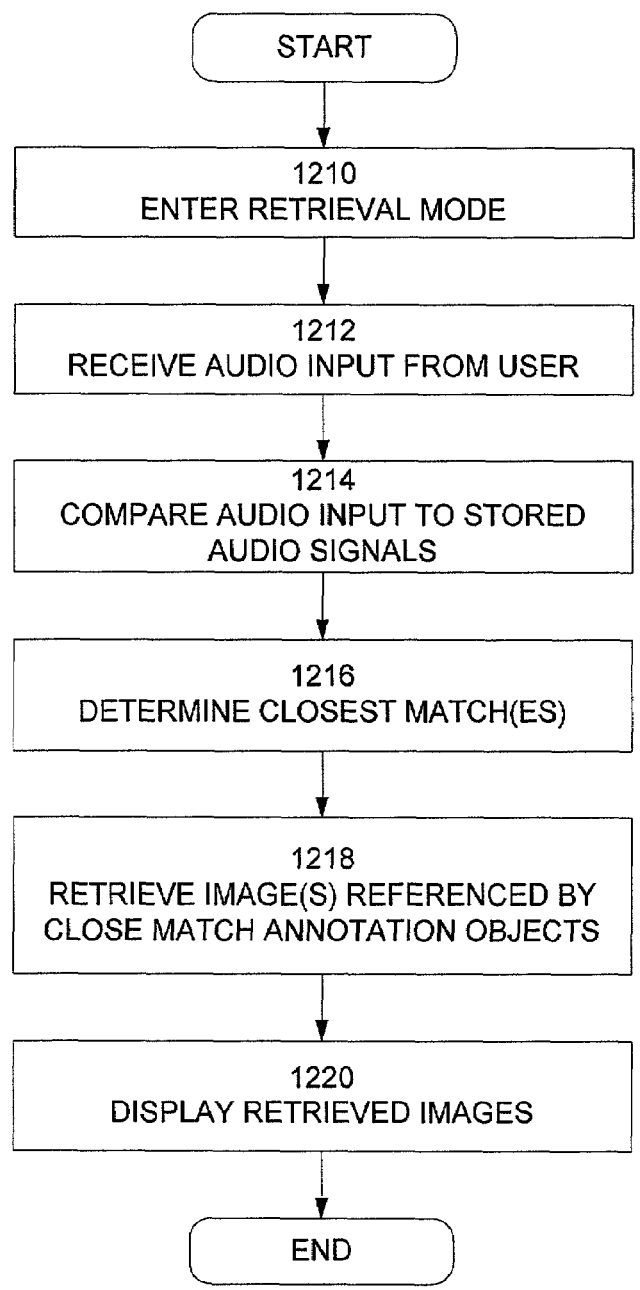
FIG. 12 is a flow chart of a preferred method for retrieving images using audio input and the audio annotations of the present invention.

Retrieval Using Audio and Annotations. Once the images have been annotated, the system of the present invention assists in the retrieval of images. In particular, the present invention allows images to be searched and retrieved using only audio input from the user. Referring now to FIG. 12, a preferred method for retrieving images using audio input and the annotations will be described. The process begins with the user entering or setting 1210 a retrieval mode of operation. This allows the system to distinguish between audio input intended to be an annotation, and audio input intended to be used as the search criteria when retrieving images. Then the system receives 1212 audio input from the user. The system converts the audio input into electrical signals and stores the audio input from the user. Next, the method compares 1214 the audio input to audio signals of existing annotation objects. Next in step 1216, the system determines the annotation objects that are the closest matches. This can be done in a similar manner as that described above with reference to FIGS. 9 and 10. Once the matches or close matches have been determined, the images referenced in the annotation objects are retrieved 1218. Finally, the retrieved images are displayed 1220 on the display device 100. Thus, the annotation objects are particularly advantageous because they allow the user to search and retrieve images based on audio input alone.

While the present invention has been described with reference to certain preferred embodiments, those skilled in the art will recognize that various modifications may be provided. For example, the point and talk functionality provided by the present invention may be used to augment the capabilities already existing in a multimedia message system. Variations upon and modifications to the preferred embodiments are provided for by the present invention, which is limited only by the following claims.

What is claimed is:

1. An apparatus for direct annotation of objects, the apparatus comprising:
   a display device for displaying one or more images;
   an audio input device for receiving an audio signal;
   a storage device for storing a plurality of different visual notations each comprising a text or a graphic image and for storing a plurality of corresponding audio signals;
   a direct annotation creation module coupled to receive the audio signal from the audio input device and to receive a reference to a location within an image on the display device, the direct annotation creation module, in response to receiving the audio signal and the reference to the location within the image, automatically creating an annotation object, independent from the image, that associates the input audio signal, the location and one of the plurality of different visual notations; and
   an audio vocabulary comparison module coupled to the audio input device, the storage device and the direct annotation creation module, the audio vocabulary comparison module receiving audio input and finding a corresponding one of the plurality of different visual notations that matches content of the audio input.

2. The apparatus of claim 1 further comprising an annotation display module coupled to the direct annotation creation module, the annotation display module generating symbols or text representing the annotation objects.

3. The apparatus of claim 1 further comprising an annotation audio output module coupled to the direct annotation creation module, the annotation audio output module generating audio output in response to user selection of an annotation symbol representing an annotation object.

4. The apparatus of claim 1 further comprising:
   an audio vocabulary storage for storing a plurality of audio signals and corresponding text strings;
   a dynamic vocabulary updating module coupled to the audio vocabulary storage and the audio input device, the dynamic vocabulary updating module for displaying an interface to create a new entry in the audio vocabulary storage, the dynamic vocabulary updating module receiving an audio input and a text string and creating the new entry in the audio vocabulary storage that includes a new visual annotation.

5. The apparatus of claim 1 further comprising a media object cache for storing media and annotation objects.

6. A computer program product having a computer-readable storage medium storing computer-executable code for direct annotation of objects, the code comprising:
   a media object storage for storing media, annotation objects, a plurality of different visual notations each comprising a text or a graphic image and a plurality of corresponding audio signals;
   a direct annotation creation module coupled to receive an audio signal, a selected visual notation from the plurality of different visual notations and a reference to a location within an image, the direct annotation creation module, in response to receiving the audio signal or the reference to the location within the image, automatically creating an annotation object, independent of the image, that associates the audio signal, the selected visual notation and the location, and the direct annotation creation module storing the audio annotation in the media object storage;
   an audio vocabulary comparison module coupled to the media object storage and the direct annotation creation module, the audio vocabulary comparison module receiving audio input and finding a corresponding one of the plurality of different visual notations that matches content of the audio input; and
   an annotation output module coupled to the direct annotation creation module, the annotation output module generating audio or visual output in response to user selection of an annotation symbol representing the annotation object.

7. A computer implemented method for direct annotation of objects, the method comprising the steps of:
   displaying an image;
   receiving audio input;
   detecting selection of a location within the image;
   comparing the audio input to a vocabulary;
   finding a corresponding one of a plurality of different visual notations that matches content of the audio input; and
   creating an annotation object, independent of the selected image, that provides an association between the image, the audio input, the selected location, the found corresponding one of a plurality of different visual notations comprising text or a graphic image, the annotation object including at least a text annotation field, an image reference field, and an annotation location field, the creating step occurring automatically in response to the receiving or detecting.

8. The method of claim 7, wherein the step of displaying is performed before or simultaneously with the step of receiving.

9. The method of claim 7, wherein the step of receiving is performed before or simultaneously with the step of displaying.

10. The method of claim 7, further comprising the step of displaying the one of the plurality of different visual notations to indicate that the image has an annotation.

11. The method of claim 7, wherein the step of creating an annotation object includes storing the annotation object in an object storage.

12. The method of claim 11, further comprising the step of recording the audio input received.

13. The method of claim 12, wherein the step of creating the annotation object includes creating an annotation object including a reference to the selected location, the recorded audio input and one of the plurality of different visual annotations, and storing the annotation object in an object storage.

14. The method of claim 11, wherein the step of creating an annotation object includes storing the text as part of the annotation object.

15. The method of claim 11, further comprising the steps of:
   determining if the audio input has a matching entry in the vocabulary; and
   storing the entry as part of the annotation object if the audio input has a matching entry in the vocabulary.

16. The method of claim 15, further comprising the steps of:
   determining if the audio input has a close match in the vocabulary;
   displaying the close matches;
   receiving input selecting a close match; and
   storing the selected close match as part of the annotation object if the audio input has a close match in the vocabulary.

17. The method of claim 16, further comprising the step of displaying a message that the image has not been annotated if there is neither a matching entry in the vocabulary nor a close match in the vocabulary.

18. The method of claim 16, further comprising the following steps if there is neither a matching entry in the vocabulary nor a close match in the vocabulary:
   receiving text input corresponding to the audio input;
   updating the vocabulary with a new entry including the audio input and the text input; and
   wherein the received text is stored as part of the annotation object.

19. The method of claim 11, further comprising the steps of:
   receiving text input corresponding to the audio input;
   updating the vocabulary with a new entry including the audio input and the text input.

20. A computer implemented method for displaying objects with annotations, the method comprising the steps of:
   receiving audio input;
   finding a corresponding annotation object comprising one of a plurality of different visual notations, the plurality of different visual notations referencing a close match to content of the audio input;
   retrieving an image associated with the corresponding annotation object;
   displaying the image with one of the plurality of different visual notations to indicate that an annotation exists;
   receiving user selection of the one visual notation;
   generating the annotation automatically, in response to user input of a location within the image and an audio input;
   outputting the annotation associated with the selected visual notation;
   determining whether the annotation includes text;
   retrieving a text annotation for the selected visual notation; and
   displaying the retrieved text with the image.

21. The method of claim 20, wherein the annotation is text and the step of outputting is displaying the text proximate the image that it annotates.

22. The method of claim 20, wherein the annotation is an audio signal and the step of outputting is playing the audio signal.

23. The method of claim 20, further comprising the steps of:
   determining whether the annotation includes an audio signal;
   retrieving an audio signal for the selected visual annotation; and
   wherein the step of outputting is playing the audio signal.

24. A computer implemented method for retrieving images, the method comprising the steps of:
   receiving audio input;
   finding corresponding annotation objects comprising one of a plurality of different visual notations, the plurality of different visual notations referencing a close match to content of the audio input, each corresponding annotation object generated automatically in response to user input of a location within an image and an audio signal, where a recording of the audio signal is terminated automatically based on a predetermined audio level;
   retrieving the images that are referenced by the found annotation objects; and
   displaying the retrieved images, the plurality of different visual notations for the found corresponding annotation objects and wherein each of the found corresponding annotation objects include at least an audio input field, an image reference field, and an annotation location field.

25. The method of claim 24, wherein the step of determining annotation objects further comprises the steps of:
   comparing the audio input to an audio signal reference of the annotation object; and
   determining a close match between the audio input and the audio signal reference of the annotation object if a probability metric is greater than a threshold of 80%.

26. The method of claim 24, wherein the step of determining annotation objects further comprises the steps of:
   determining the annotation objects for a plurality of images;
   for each annotation object, comparing the audio input to an audio signal reference of the annotation object; and
   determining a close match between the audio input and the audio signal reference of the annotation object if a probability metric is greater than an a threshold of 80%.

* * * * *

UNITED STATES PATENT AND TRADEMARK OFFICE
CERTIFICATE OF CORRECTION

PATENT NO. : 7,493,559 B1
APPLICATION NO. : 10/043575
DATED : February 17, 2009
INVENTOR(S) : Gregory J. Wolff and Peter E. Hart It is certified that error appears in the above-identified patent and that said Letters Patent is hereby corrected as shown below:

Column 17, line 7, delete "11," insert --7--.

Column 17, line 14, delete "11," insert --7--.

Column 17, line 17, delete "11," insert --7--.

Column 17, line 44, delete "11," insert --7--.

Signed and Sealed this

Fourteenth Day of April, 2009

JOHN DOLL
*Acting Director of the United States Patent and Trademark Office*